United States Patent Office 2,993,883
Patented July 25, 1961

2,993,883
PRODUCTION OF POLYMERS OF ETHYLENE WITH A CATALYST OF A CHROMYL HALIDE, AN ALUMINUM HALIDE, AND A HYDROCARBON METAL HALIDE
Harold D. Lyons, Bartlesville, Okla., assignor to Phillips Petroleum Company, a corporation of Delaware
No Drawing. Filed Mar. 25, 1959, Ser. No. 801,696
10 Claims. (Cl. 260—94.9)

This invention relates to the production of novel polymers of ethylene. In one aspect, it relates to a process for producing a highly crystalline polymer of ethylene having a branched configuration. In another aspect, it relates to a highly crystalline polymer of ethylene having a branched configuration.

Reactions for polymerizing ethylene are well known in the art and are generally carried out in the presence of catalyst. One class of catalyst which has been used in the polymerization of ethylene comprises an organometal compound, such as triethylaluminum, and a heavy metal compound, such as titanium tetrachloride. The ethylene polymers produced in the presence of such a catalyst system are linear polymers having a high crystallinity and containing substantially no terminal methyl groups, e.g., less than 10 terminal methyl groups per 1000 carbon atoms.

It is an object of this invention, therefore, to provide a process for preparing a highly crystalline polymer of ethylene having a branched configuration.

Another object of the invention is to provide a novel polyethylene having a highly branched molecular structure.

A further object of the invention is to provide a polyethylene which is very resistant to environmental stress cracking.

Other and further objects and advantages of the invention will become apparent to those skilled in the art upon consideration of the accompanying disclosure.

The present invention resides in the discovery of a process whereby novel polymers of ethylene having a highly branched molecular structure can be prepared. Broadly speaking, the process of this invention comprises the steps of polymerizing ethylene in the presence of a catalyst composition comprising a chromyl halide, a halide of aluminum, and at least one component selected from the following: (a) an organo compound of one of the metals sodium, potassium, lithium, rubidium, cesium, beryllium, magnesium, zinc, cadmium, mercury, aluminum, gallium, indium and thalium; (b) an organometal halide of one of the metals aluminum, gallium, indium, thallium, and beryllium; and (c) a mixture of an organic halide and at least one metal selected from the group consisting of sodium, potassium, lithium, rubidium, cesium, beryllium, magnesium, zinc, cadmium, mercury, aluminum, gallium, indium and thallium. The polymers of ethylene prepared by this process have a highly branched molecular structure, often showing more than 40 terminal methyl groups per 1000 carbon atoms. In view of this branched configuration, it is entirely unexpected that the polymers have a crystallinity of 70 percent and higher. As is well recognized in the art, the crystallinity of a polyethylene diminishes with an increase in short chain branching, e.g., methyl branching. It is believed, therefore, that the presence of a large number of terminal methyl groups indicates that the structure of the polyethylenes of this invention comprises long chain branches, i.e., a polyethylene having polyethylene branches. The density of the polyethylenes of this invention is 0.93 gm./cc. or higher at 25° C. It has also been found that the polyethylenes of this invention are very resistant to environmental stress cracking, ranging from 800 hours or longer. This property renders the polymers particularly useful as materials for the manufacture of pipes or containers for chemicals or other liquid materials.

The catalyst system of this invention includes at least one chromyl halide. It is to be understood also that mixtures of any two or more of these compounds can be used in the practice of the invention. The chromyl halides which can be used include chromyl chloride ($CrO_2Cl_2$), chromyl fluoride ($CrO_2F_2$), chromyl bromide ($CrO_2Br_2$), and chromyl iodide ($CrO_2I_2$). Methods for the preparation of these chromyl halides are described in the literature. The present catalyst system also includes a halide of aluminum. While it is generally preferred to employ aluminum trichloride, the trifluoride, tribromide and triiodide of aluminum can also be used in the catalyst system.

In admixture with one or more of the chromyl halides and aluminum halides described above, the instant catalyst system comprises an organo compound of the metals sodium, potassium, lithium, rubidium, cesium, beryllium, magnesium, zinc, cadmium, mercury, aluminum, gallium, indium and thallium. The general formula for the organo compound is $MR_x$ wherein M is one of the foregoing metals and R is a monovalent saturated acyclic hydrocarbon radical, a monovalent saturated cyclic hydrocarbon radical, a monovalent aromatic hydrocarbon radical or any combination thereof, and wherein $x$ is equal to the valence of the metal, i.e., 1, 2 or 3. Examples of compounds corresponding to the formula $MR_x$ which can be used are $C_2H_5Na$, $C_3H_7K$, $C_4H_9Li$, $Al(C_2H_3)_3$, $Al(CH_3)_3$, $Be(CH_3)_2$, $Ga(C_3H_7)_3$, $In(CH_3)_3$, $Be(C_6H_5)_2$, $Al_6(CH_{13})_3$, $Al(CH_2-(CH_2)_{18}CH_3)_3$, $Ga(C_6H_5)_3$ $In(C_6H_5)_3$, and the like. These $MR_x$ compounds can also be used in the form of their known and stable organic complexes, such as complexes with ethers, thioethers or amines. Examples of such complex compounds which can be used in admixture with the chromyl halides and aluminum halides as the catalyst are $NaAl(CH_3)_4$, $NaBe(C_6H_5)_3$, $NaBe(C_2H_5)_3$ and the like.

Alternatively, or in addition to the $MR_x$ compounds set forth above, the instant catalyst system comprises a mixure of one or more of the chromyl halides and aluminum halides described above and at least one organometal halide corresponding to the formula $R_mM'X_n$ wherein R is a monovalent saturated acyclic hydrocarbon radical, a monovalent saturated cyclic hydrocarbon radical, a monovalent aromatic hydrocarbon radical, or mixtures of these radicals, wherein M' is a metal selected from the group consisting of aluminum, gallium, indium, thallium, and beryllium, and wherein X is a halogen. The $m$ and $n$ are integers greater than zero, and the sum of $m$ and $n$ is equal to the valence of the metal M'. The X can be any of the halogens, including chlorine, bromine, iodine and fluorine. The saturated acyclic hydrocarbon radicals, saturated cyclic hydrocarbon radicals and aromatic hydrocarbon radicals which can be substituted for R in the formula include hydrocarbon radicals having up to about 20 carbon atoms each. Radicals having 10 carbon atoms or less are preferred since the resulting catalyst composition has a greater activity for initiating the polymerization. Mixtures of two or more of these organometal halide components, such as a mixture of ethylaluminum dichloride and diethylaluminum chloride, can be used in the catalyst composition. Specific examples of other organometal halides which are useful in preparing the catalysts of this invention include the following: $CH_3AlCl_2$, $(CH_3)_2AlCl$, $C_2H_5AlCl_2$, $(C_2H_5)_2AlCl$, $(C_2H_5)_3AlBr$, $(C_4H_9)_2AlBr$, $C_8H_{17}AlI_2$, $(C_3H_7)_2GaF$, $(C_6H_{11})_2GaCl$ (cyclohexane derivative), $C_6H_5GaBr_2$ (benzene derivative),

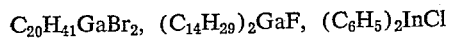

$C_{20}H_{41}GaBr_2$, $(C_{14}H_{29})_2GaF$, $(C_6H_5)_2InCl$ (benzene derivative), $C_8H_{17}InF_2$, $C_6H_{11}InBr_2$ (cyclohexane derivative), $C_{17}H_{35}BeI$, $CH_3BeBr$, and the like.

Alternatively, or in addition to the $MR_x$ compounds and/or the $R_mM'X_n$ compounds described above, the instant catalyst system comprises a mixture of one or more of the chromyl halides and aluminum halides mentioned above and a mixture of an organic halide and a free or elemental metal. These organic halides include chloro-, bromo-, iodi-, and fluoro-substituted organic halides, and can be mono-, di-, tri-, or tetra-substituted organic halides. Within the broad class of organic halides, the class of halides defined as monohalogen-substituted hydrocarbons having a maximum carbon chain length not greater than 8 carbon atoms is preferred since they are more easily handled in a commercial operation and are active to initiate the polymerization of ethylene when used in the catalyst composition of this invention. Still more desirably, the organic halide which is used in the catalyst is a lower alkyl monohalide having a maximum carbon chain length not greater than 8 carbon atoms. Examples of these organic halides which can be employed in the catalyst are ethyl bromide, propyl chloride, butyl iodide, and pentyl fluoride. Other examples are 1,2-dibromoethane, 1,3-dibromopropane, 1,2,3-tribromopropane, 1,2,3-trichloropropane, 1,1-difluoroethane, and 1,4-diiodobutane. Other acyclic and cyclic halides as well as aromatic halides can also be employed. Examples of these include 1,3-dichlorocyclohexane, benzyl chloride, 1,4-dichlorobenzene, 1-bromodecane, 1-chlorododecane, 2-chlorooctane, 2-chloro-4-methyloctane, cyclopentyl chloride, 1-chloro-3-phenylpropane, 1-bromo-3-phenylhexane, cyclohexyl chloride, phenyl chloride, and the like. Also, alkenyl halides, such as allyl bromide, and alkynyl halides, such as propargyl chloride, can be used. The metals which are employed in admixture with the organic halide include one or more of sodium, potassium, lithium, rubidium, cesium, beryllium, magnesium, zinc, cadmium, mercury, aluminum, gallium, indium and thallium. The metals are usually used in the form of shavings, turnings or finely divided powder. Various mixtures or combinations of the above-mentioned organic halides and metals can be employed in the catalyst composition of this invention.

As has been indicated, all possible combinations of an organo compound corresponding to the formula $MR_x$ and/or an organometal halide corresponding to the formula $R_mM'X_n$ and/or a mixture of an organic halide as set forth above together with a free or elemental metal with one or more of each of the chromyl halides and aluminum halides described above are used in the catalyst composition of this invention. The catalyst composition falling within the scope of this disclosure which is preferred comprises a mixture of chromyl chloride and aluminum trichloride with an approximately equimolar mixture of ethylaluminum dichloride and diethylaluminum chloride.

The amount of the catalyst composition of this invention which is used in the polymerization of ethylene can vary over a rather wide range. Relatively small amounts of the catalyst provide the desired activating effect when the polymerization reaction is carried out as a batch process with the continuous addition of the ethylene to be polymerized. A convenient catalyst level lies in the range of 0.01 to 1.0 weight percent based on the ethylene.

The ratio of the amount of organometal compound to chromyl halide is usually in the range of 0.05 to 50, preferably 0.1 to 10.0, mols of the organometal compound per mol of chromyl halide. When operating with an organometal halide, e.g., an alkyl metal halide, such as diethylaluminum chloride, ethylaluminum dichloride or mixtures of these compounds, often designated as ethylaluminum sesquichloride, the ratio of the compound to chromyl halide is in the range of 0.05 to 50, preferably 0.1 to 10.0, mols per mol of the chromyl halide. When using a mixture of a metal and an organic halide, the metal and chromyl halide are used in a mol ratio of 0.02 to 50, preferably 0.1 to 10. The mol ratio of the organic halide to chromyl halide is usually in the range of 0.02 to 50, preferably 0.1 to 10. The mol ratio of the aluminum halide to chromyl halide is generally in the range of 1:1 to 15:1, preferably 2:1 to 10:1.

The temperature used in the polymerization can vary over a rather wide range, e.g., from 200 to 500° F. However, it is usually preferred to operate at a temperature in the range of 200 to 350° F. Pressures employed in the polymerization reaction can range from atmospheric and below up to 30,000 p.s.i.g. or higher although pressures in the range of 100 to 1000 p.s.i.g. are preferred.

It is usually preferred to carry out the polymerization reaction in the presence of a hydrocarbon diluent, at a pressure sufficient to maintain the diluent in the liquid phase. However, the polymerization process of this invention proceeds in the gaseous phase without the presence of a diluent. Diluents suitable for use in the polymerization process include paraffins, halogenated paraffins, cycloparaffins and/or aromatic hydrocarbons, which are relatively inert, non-deleterious to the catalyst, and liquid under conditions of the process. Examples of such hydrocarbon diluents include propane, butane, pentane, hexane, isooctane, cyclohexane, methylcyclohexane, xylenes, benzene, toluene, and the like. Mixtures of any two or more of the above described diluents can be employed as well in the process of this invention.

The process of this invention can be carried out as a batch process by pressuring the ethylene into a reactor containing the catalyst and diluent, if the latter is used. The process can also be carried out in a continuous manner by maintaining the above-described concentration of reactants in the reactor for a suitable residence time. The residence time used in a continuous process can vary widely, since it depends to a great extent upon the temperature at which the process is carried out. However, the residence time for the polymerization within the preferred temperature range of 200 to 350° F. usually falls within the range of 1 second to an hour or more. In the batch process the time for the reaction can also vary widely, such as up to 24 hours or more.

It has been found that various materials in some instances may have a tendency to inactivate the catalyst composition of this invention. These materials include carbon dioxide, oxygen and water. Therefore, it is usually desirable to free the ethylene from these materials, as well as from other materials which may tend to inactivate the catalyst, before contacting the ethylene with the catalyst. Any of the known means for removing such contaminants can be employed. When a diluent is used in the process, this material should likewise be freed of contaminants, such as water, oxygen, and the like. It is desirable also that air and moisture be removed from the reaction vessel before the reaction is carried out. However, in some cases, small amounts of catalyst-inactivating materials, such as oxygen or water, can be tolerated in the reaction mixture while still obtaining reasonably good polymerization rates. It is to be understood that the amount of such materials present in the reaction mixture shall not be sufficient to completely inactivate the catalyst.

At the completion of the polymerization reaction, any excess ethylene is vented and the contents of the reactor are then treated to inactivate the catalyst and remove the catalyst residue. In one suitable method, the inactivation of the catalyst is accomplished by washing with an alcohol, water or other suitable material. In some instances, the catalyst inactivating treatment also removes a major proportion of the catalyst residues while in other cases it may be necessary to treat the polymer with an acid, base or other suitable material in order to effect the desired removal of the catalyst residues. The treatment of the polymer may be carried out in a comminution zone, such as a Waring Blendor, so that a finely divided polymer is thereby provided. The polymer is then separated from the diluent and treating agents, e.g., by decantation or filtration, after which the polymer is dried. The diluent and treating agents can be separated by any suitable means, e.g., by fractional distillation, and reused in the process.

A more comprehensive understanding of the invention may be obtained by referring to the following illustrative examples which are not intended, however, to be unduly limitative of the invention.

EXAMPLE I

A run was carried out in which the novel polymer of ethylene of this invention was prepared. A stainless steel autoclave was initially charged with 400 ml. of cyclohexane. While purging the system with nitrogen, 20 ml. of a solution of ethylaluminum sesquichloride in cyclohexane (3 grams of $Al_2Et_3Cl_3$), 1.9 grams of chromyl chloride, and 10 grams of aluminum trichloride were added to the autoclave. The autoclave was then closed and purged three times with ethylene. Thereafter, ethylene was pressured into the autoclave so that the reactor pressure equaled the pressure of the ethylene cylinder. Heating of the autoclave was then commenced and continued until the temperature was about 200° F. At this point an exothermic reaction was initiated, and at 212° F. the heat and ethylene feed were shut off. The reactor temperature remained in the range of 250 and 300° F. for about 1.5 hours after which the reaction became slower and the temperature decreased. After the reactor had cooled to room temperature, it was opened and found to be filled with solid polymer. The polymer was cut up into small pieces and ground in a Waring Blendor in the presence of methanol, after which it was separated from the methanol and dried in a vacuum oven at about 75° C.

A portion of the polymer product was evaluated to determine certain of its properties. The results of the evaluation are shown hereinbelow in the table.

EXAMPLE II

A control run was carried out in which essentially the same procedure described in Example I was followed. However, in this run, the autoclave was charged with 400 ml. cyclohexane, 7 grams of ethylaluminum sesquichloride, and 1.5 grams of chromyl chloride. The maximum temperature employed in the polymerization was 183° F. After removal of the product from the reactor, it was comminuted in a Waring Blendor with methanol, recovered, and then dried. Fifty-two grams of white polymer was obtained. The product from this run was also evaluated, and the results are set forth in the table. It is seen from the data in the table that a polyethylene prepared according to this invention as in Example I has a highly branched molecular structure while still having a high crystallinity. This polymer is to be compared with that of the control run of Example II which contains only 3.7 methyl groups per 1000 carbon atoms.

Table

| Polymer from | Example I | Example II |
|---|---|---|
| Inherent Viscosity [1] | 3.68 | 8.62 |
| Melt Index [2] | 0.06 | 1.40 |
| Density, gm./cc. at 23° C.[9] | 0.9409 | 0.9556 |
| Crystalline Freezing Point, °F.[3] | 246 | 253 |
| Stiffness, p.s.i.[4] | 43,000 | 126,000 |
| Hardness, Shore D [5] | 57 | 69 |
| Tensile Strength at Yield, p.s.i. (Compression molded) [6] | 2,600 | 2,905 |
| Elongation at Break, percent (Compression molded) [6] | 47 | 595 |
| Environmental Stress Cracking, hours [7] | 850 | 350 |
| Infrared Examination: [8] | | |
|   Crystallinity, percent | 83 | 94 |
|   Terminal Methyl Groups/1,000 carbon | 43.2 | 3.7 |
|   Trans Internal/1,000 carbon | none | 0.06 |
|   Vinyl/1,000 carbon | none | 0.21 |

[1] Determined by method of Kemp et al., Ind. and Eng. Chem. 35, 1108 (1943).

[2] Determined by method of ASTM D–1238–52T as modified by taking 5 samples at 2 minute intervals, averaging the 5 values (weights), discarding any values which deviate from the average by more than 5 wt. percent, reaveraging and multiplying by 5 to obtain the amount of polymer extruded in 10 minutes. The melt index of the polymer of Example I is defined as the grams of polymer extruded in 10 minutes through an 0.0825 inch orifice at 190° C. when subjected to a load of 2,160 grams. The value given for the polymer of Example II represents a high load melt index, 10 times the normal load having been used.

[3] Determined by melting a polymer sample, inserting a thermocouple into the molten polymer, and allowing the molten polymer to cool slowly. The temperature is recorded and plotted on a chart versus time. The crystalline freeze point is the midpoint of the first plateau in the time vs. temperature curve.

[4] Determined by method of ASTM D747–50.

[5] Determined by method of ASTM D676–55T.

[6] Determined by method of ASTM D412–51T.

[7] Test specimens for the environmental stress cracking tests were die cut from compression molded slabs 0.125±0.005 inch thick. The dimensions of these specimens were 1.5±0.1 inch by 0.50±0.02 inch. Each sample was given a controlled imperfection 0.750±0.005 inch long and 0.020–0.025 inch deep parallel to the long edges of the sample and centered on one of the broad faces. Each of the 10 test specimens was bent into a loop with the controlled imperfection on the outside and inserted in a holder one above the other in a manner such that the samples did not touch one another. The holder was then inserted in a tube which was filled to approximately 0.5 inch above the top specimen with an alkyl aryl polyethylene glycol (Igepal CO-630, General Dyestuff Corp., New York, N.Y.), a surface active agent, which had been adjusted to a temperature of 23±1.1° C. The tube was then stoppered and placed in a constant temperature bath at 50±0.5° C. The controlled imperfections were not allowed to touch the tube during the test. The test specimens were examined at intervals, and any crack visible to the unaided eye was interpreted as a failure, exclusive of extension of the controlled imperfection. The number of failures was plotted versus the logarithm of time and the best line was drawn through these points. The stress-crack time, $F_{50}$, is the time in hours taken from the curve at five failures. This test is similar to that described in Industrial and Engineering Chemistry, 43, 117–121 (1951).

[8] The values were determined on a Perkin-Elmer Model 21 spectrophotometer equipped with a sodium chloride prism. The measurements were made using polymer films prepared by molding at 165° C. and 6,000 p.s.i.g. The mold was cooled by a current of air to room temperature at the rate of 14° C. per minute, and the molding operation was conducted in a manner such that the polymer was protected from atmospheric oxygen. For the measurement of crystallinity, the maximum absorption band was determined in the 5.0 to 5.4 micron region, the extinction per millimeter was calculated for this maximum, and the resulting value was referred to a graph of crystallinity versus extinction values obtained from known standards by nuclear magnetic resonance (Wilson and Pake, J. Poly. Sci. 10, 503 (1953)). Terminal methyl groups were determined using films as described above, obtaining an adsorption band maximum in the region between about 7.1 and 7.5 microns and from this value calculating terminal methyl groups per 1,000 carbon atoms. For trans internal unsaturation per 1,000 carbon atoms, a maximum in the range between the maxima on either side of the 10.35 micron band was determined and the value calculated from this maximum (if any). For vinyl unsaturation, a maximum was found in the region between 10.7 and 11.5 microns and the value calculated from this maximum (if any).

[9] The density values were obtained by the use of a density gradient column which was prepared according to the method of Tung and Taylor, J. Polymer Science, 17, 441 (1955), ibid. 19, 598 (1956), and ibid. 21, 144 (1956). In preparing polyethylene samples for the tests, polymer from each run was molded into a slab in a mold heated at 420° F. When the polymer was molten, the mold was cooled to about room temperature at the rate of about 15° F. per minute. Thereafter, the slab was removed from the mold, and a piece of the slab about the size of a pea was used in the density determination test. In this test, a tube having a length slightly over one meter and an inside diameter of 4 cm. is graduated into one-millimeter divisions. The tube is filled with a water-ethanol mixture, introduced in a manner such that the ratio of ethanol to water increases progressively from the bottom to the top. The density of the liquid contents is thus diminished uniformly up the tube. Hollow glass beads of known densities within the range of the density gradient in the tube are introduced into the column and these beads settle to a point where their density is in equilibrium with that of the liquid. The positions of the beads are plotted against density on a graph. A sample of polyethylene, prepared as just described, is dropped in the column and after about 15 minutes, the sample comes to rest at a point where its weight is exactly equal to the weight of the displaced liquid. The position is noted and referred to the graph, from which the density can be determined with an accuracy within the limits of ±0.0002 gm./cc. Since the tubes are operated at ambient temperature, it is necessary to plot the positions of the beads for each set of determinations.

The polymers produced in accordance with this invention have utility in applications where solid plastics are used. They can be molded or extruded to form articles of any desired shape, such as bottles and other containers for liquids. Furthermore, they can be formed into pipe by extrusion.

It will be apparent to those skilled in the art that variations and modifications of the invention can be made upon study of the foregoing disclosure. Such variations and modifications are believed to be clearly within the spirit and scope of the invention.

I claim:

1. A process for preparing a polymer of ethylene which comprises contacting ethylene with a catalyst consisting essentially of a chromyl halide, an aluminum halide and an organometal halide corresponding to the formula $R_mM'X_n$, wherein R is a radical selected from the group consisting of a monovalent saturated acyclic hydrocarbon radical, a monovalent saturated cyclic hydrocarbon radical and a monovalent aromatic hydrocarbon radical, M' is a metal selected from the group consisting of aluminum, gallium, indium, thallium and beryllium, X is a halogen, $m$ and $n$ are integers greater than zero and the sum of $m$ and $n$ is equal to the valence of said metal M'.

2. A process for preparing a polymer of ethylene which comprises contacting ethylene with a catalyst consisting essentially of a chromyl halide, an aluminum halide and an organometal halide corresponding to the formula $R_mM'X_n$, wherein R is a radical selected from the group consisting of a monovalent saturated acyclic hydrocarbon radical, a monovalent saturated cyclic hydrocarbon radical and a monovalent aromatic hydrocarbon radical, M' is a metal selected from the group consisting of aluminum, gallium, indium, thallium and beryllium, X is a halogen, $m$ and $n$ are integers greater than zero and the sum of $m$ and $n$ is equal to the valence of said metal M'. said contacting occuring in the presence of a hydrocarbon diluent at a temperature in the range of 200 to 500° F. and at a pressure sufficient to maintain said diluent in the liquid phase; and recovering the polymer so produced.

3. A process according to claim 2 in which said catalyst consists essentially of chromyl chloride, aluminum trichloride and a mixture of ethylaluminum dichloride and diethylaluminum chloride.

4. A polymer of ethylene prepared according to the process of claim 2.

5. A process according to claim 2 in which the mol ratio of said aluminum halide to said chromyl halide is in the range of 1:1 to 15:1 and the ratio of the amount of said organometal halide to said chromyl halide is from 0.05 to 50 mols of said organometal halide per mol of said chromyl halide.

6. A process according to claim 2 in which the mol ratio of said aluminum halide to said chromyl halide is in the range of 2:1 to 10:1 and the ratio of the amount of said organometal halide to said chromyl halide is from 0.1 to 10 mols of said organometal halide per mol of said chromyl halide.

7. A process for preparing a polymer of ethylene which comprises contacting ethylene with a catalyst consisting essentially of chromyl chloride, aluminum trichloride and a mixture of ethylaluminum dichloride and diethyl-aluminum chloride, said contacting occurring in the presence of a hydrocarbon diluent at a temperature in the range of 200 to 350° F. and at a pressure in the range of 100 to 1000 p.s.i.g.

8. A catalyst composition consisting essentially of a chromyl halide, an aluminum halide and an organometal halide corresponding to the formula $R_mM'X_n$, wherein R is a radical selected from the group consisting of a monovalent saturated acyclic hydrocarbon radical, a monovalent saturated cyclic hydrocarbon radical and a monovalent aromatic hydrocarbon radical, M' is a metal selected from the group consisting of aluminum, gallium, indium, thallium and beryllium, X is a halogen, $m$ and $n$ are integers greater than zero and the sum of $m$ and $n$ is equal to the valence of said metal M'.

9. A catalyst composition according to claim 8 in which the mol ratio of said aluminum halide to said chromyl halide is in the range of 1:1 to 15:1 and the ratio of the amount of said organometal halide to said chromyl halide is from 0.05 to 50 mols of said organometal halide per mol of said chromyl halide.

10. A catalyst composition consisting essentially of chromyl chloride, aluminum trichloride and a mixture of ethylaluminum dichloride and diethylaluminum chloride.

References Cited in the file of this patent

UNITED STATES PATENTS

| 2,826,570 | Ivett | Mar. 11, 1958 |
| 2,886,561 | Reynolds et al. | May 12, 1959 |
| 2,888,424 | Precopio et al. | May 26, 1959 |

FOREIGN PATENTS

| 785,314 | Great Britain | Oct. 23, 1957 |